(12) United States Patent
Beasley et al.

(10) Patent No.: US 8,528,671 B2
(45) Date of Patent: Sep. 10, 2013

(54) INTEGRATED TRACK ADJUSTMENT/RECOIL SYSTEM UNIT AND TRACK TYPE MACHINE USING SAME

(75) Inventors: Christopher Ryan Beasley, East Peoria, IL (US); Joshua Louis Nuechterlein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 252 days.

(21) Appl. No.: 12/917,746

(22) Filed: Nov. 2, 2010

(65) Prior Publication Data

US 2012/0103704 A1 May 3, 2012

(51) Int. Cl.
*B62D 55/30* (2006.01)

(52) U.S. Cl.
USPC .............................. 180/9.1; 305/145; 305/153

(58) Field of Classification Search
USPC ................. 180/9.54, 9.56, 9.5, 9.1; 305/143, 305/145, 148, 153, 144, 146, 167, 154, 125
See application file for complete search history.

(56) References Cited

U.S. PATENT DOCUMENTS

| | | | |
|---|---|---|---|
| 3,692,368 A * | 9/1972 | Alexander | ..................... 305/146 |
| 3,792,910 A | 2/1974 | Kaufman et al. | |
| 4,323,283 A | 4/1982 | Muramoto et al. | |
| 4,470,583 A | 9/1984 | Peiffer et al. | |
| 4,681,376 A | 7/1987 | Rimi | |
| 7,156,185 B2 | 1/2007 | Juncker | |
| 7,252,349 B2 | 8/2007 | Livesay et al. | |
| 2009/0200862 A1 | 8/2009 | Matthys | |

FOREIGN PATENT DOCUMENTS

DE 1158379 1/1961

* cited by examiner

*Primary Examiner* — Anne Marie M Boehler
(74) *Attorney, Agent, or Firm* — Liell & McNeil

(57) ABSTRACT

A track type machine includes an integrated track adjustment/recoil system unit cantilever mounted in a track roller frame, and operable to resist movement of the idler along a recoil line. The integrated track adjustment/recoil system unit includes track adjust cylinder that is attached to a gas cylinder by a joining component that has two sets of identical external threads mated to the track adjust cylinder and the gas cylinder respectively. A track adjust piston is partially received in the track adjust cylinder, and a recoil piston is positioned in the gas cylinder. The recoil piston and the gas cylinder define a gas volume. The recoil piston, the gas cylinder, the joining component, the track adjust cylinder and the track adjust piston define a grease volume. Track tensioning is adjusted by adjusting the amount of grease in the grease volume, and the recoil action is adjusted by setting the gas pressure in the gas volume.

14 Claims, 4 Drawing Sheets

INTEGRATED TRACK ADJUSTMENT/RECOIL SYSTEM UNIT AND TRACK TYPE MACHINE USING SAME

TECHNICAL FIELD

The present disclosure relates generally to recoil and track adjustment systems for track type machines, and more particularly to an integrated track adjustment/recoil system unit.

BACKGROUND

Track type tractors are one type of machine that utilize an idler recoil system in order to better allow the tracks of the machine to interact with variable loads encountered when the machine is being maneuvered over the ground. A typical track system may include a forward idler that is supported by a track roller frame assembly about which the track is mounted. The idler may typically be connected to a yoke that may slide fore and aft within the track roller frame assembly in order to react to various loads that are transmitted from the track to the idler. The yoke in turn acts upon a spring that is compressed when the idler and yoke are pushed into the track roller frame assembly. The spring then pushes back on the yoke and idler to recoil both toward their undisturbed operating configuration.

In the past, recoil springs were usually made up of heavy mechanical springs. More recently, such as shown in co-owned U.S. Pat. No. 7,252,349, gas springs have been gaining wider acceptance and usage. Gas springs have the advantage over conventional mechanical springs in that their pre-load can be adjusted by adding or removing gas, such as nitrogen, to and from the gas spring. The '349 patent is also of interest for teaching the inclusion of a track tensioning feature located between the yoke and the gas spring of the recoil system. In particular, a grease volume may be filled with a selected volume of grease to adjust the effective distance between the gas spring and the yoke, thereby adjusting a forward position of the idler, and consequently the tension in the track that is mounted about the track roller frame assembly.

Although a variety of track roller frame assemblies and their associated recoil systems have performed well over many years, there remains room for improvement, particularly in the areas of assembly, packaging and servicing. For instance, the '349 patent teaches a recoil and adjustment system for a track type tractor in which the various components of the recoil system are individually attached within the track roller frame housing. This construction can make assembly more cumbersome and give rise to possible misalignment compensation strategies associated with a line of force from the idler, through the yoke, through the tensioning adjustment system and finally to the recoil gas spring.

Co-owned U.S. Patent Application Publication 2009/0200862 shows another incremental improvement in that the idler recoil and track adjustment device is a separate unit that is preassembled and installed into a track roller frame as an assembled unit at the time of manufacture of the track type machine. In this design, the remote end of the unit is supported in a socket defined by an internal surface of the track roller frame, while the yoke end is supported by, and attached to, a bulkhead of the track roller frame by an array of fasteners that surround the recoil shaft. While this design has shown considerable promise, there remains room for improvement, especially with regard to packaging, servicing, installation, cost and performance.

The present disclosure is directed toward one or more of the problems associated with recoil systems for the machines including but not limited to assembly, packaging and servicing.

SUMMARY OF THE DISCLOSURE

An integrated track adjustment/recoil system unit for installation in a track roller frame of a track type machine includes a track adjust cylinder defining a bore extending therethrough. The track adjustment cylinder includes a bulkhead attachment flange defining an array of fastener bores, and one end of the bore is defined by a set of internal threads. A track adjust piston is partially received in the bore and is surrounded by the array of fastener bores. A joining component defines a fluid passage therethrough, and includes a first set of external threads mated to the internal threads of the track adjust cylinder. A gas cylinder includes a set of internal threads mated to a second set of external threads of the joining component. A recoil piston is positioned inside the gas cylinder and has a hydraulic face exposed to fluid pressure in the track adjust cylinder, and a pneumatic face exposed to fluid pressure in the gas cylinder. The recoil piston and the gas cylinder define a gas volume. The recoil piston, the joining component, the track adjustment cylinder, the gas cylinder and the track adjustment piston define a grease volume.

In another aspect, a track type machine includes a machine body that includes a track roller frame with a bulkhead. An idler is mounted in the track roller frame and has an axle movable with respect to the track roller frame along a recoil line. An integrated track adjustment/recoil system unit is cantilever mounted in the track roller frame and is operably coupled to resist movement of the idler along the recoil line. The integrated track adjustment recoil system unit includes a bulkhead attachment flange in contact with an idler side of the bulkhead.

A method of operating the track type machine includes moving a machine by moving a track around a track roller frame. Recoil forces are reacted with a single spring only through an idler side of a bulkhead of the track roller frame at a location closer to an idler than a back end of an integrated track adjustment/recoil system unit. The idler moves along a straight recoil line during a recoil event.

DETAILED DESCRIPTION

Figure 1:
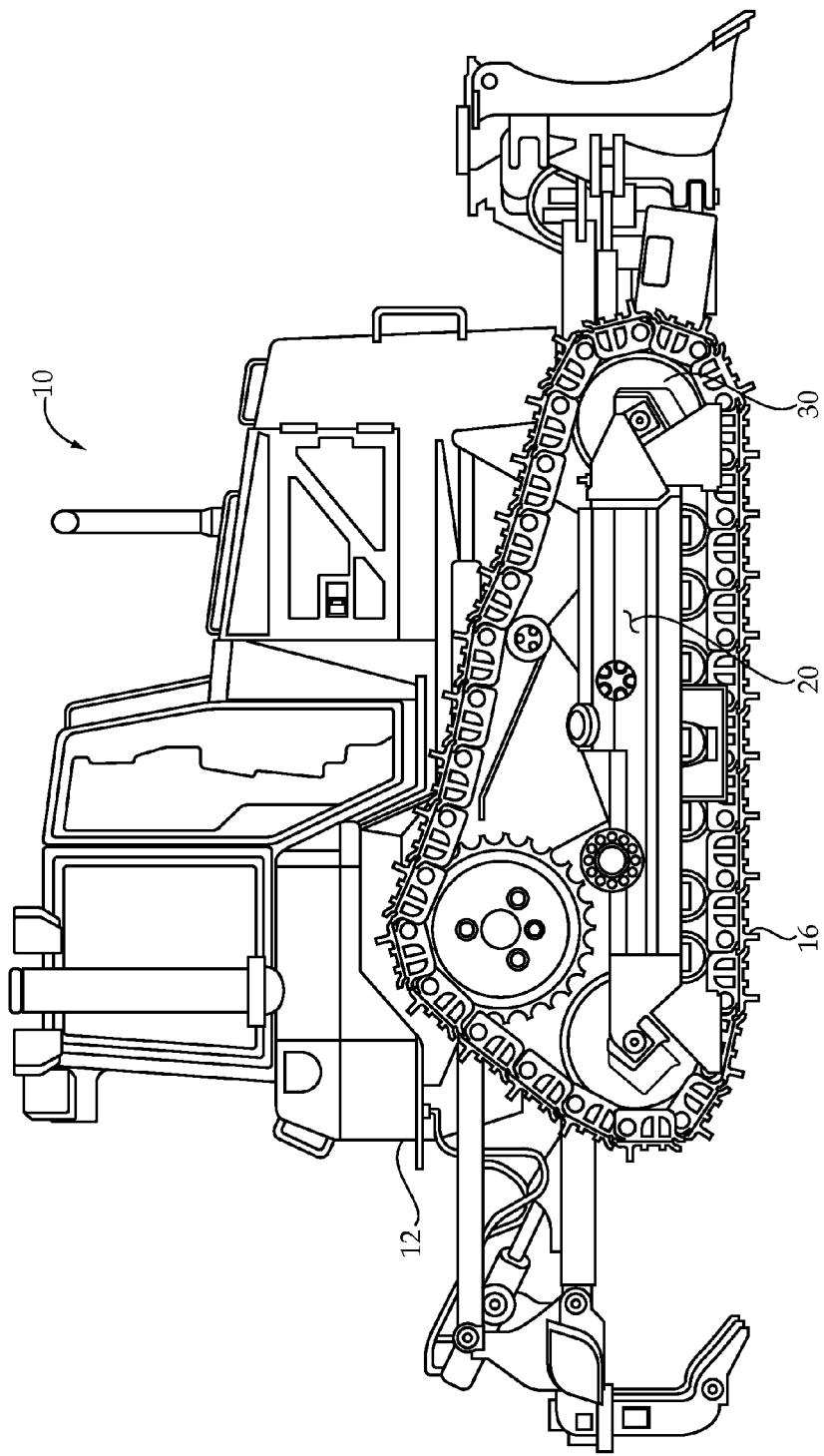
FIG. 1 is a side view of a track type machine according to the present disclosure.

Referring to FIG. 1, a track type machine 10 includes a machine body 12. A track roller frame 20, which is a portion of machine body 12, supports an idler 30 and a track 16 that moves around the track roller frame 20 when machine 10 is maneuvering. Although track type machine 10 is illustrated as a track type tractor, those skilled in the art will appreciate that the present disclosure is equally applicable to any track type machine that includes an idler equipped to move along a recoil line in order to accommodate dynamic recoil events.

Figure 2:
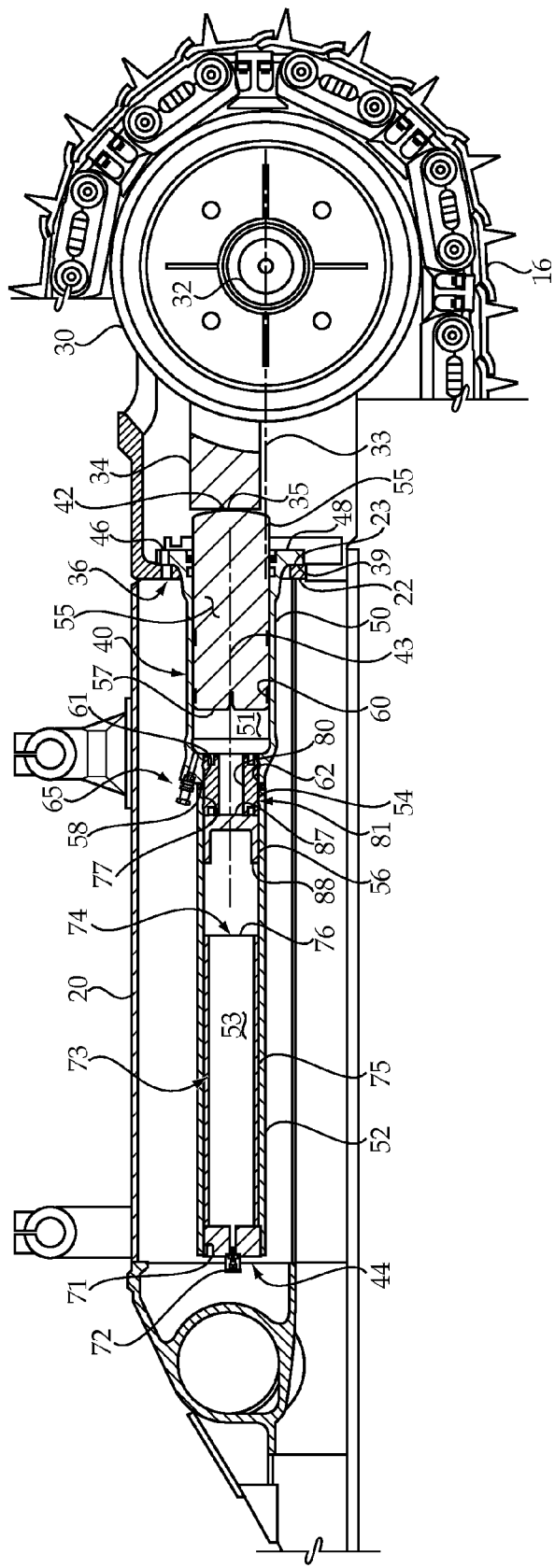
FIG. 2 is a side sectioned view through a track roller frame and an integrated track adjustment/recoil system unit that are portions of the track type machine of FIG. 1.

Referring now to FIG. 2, a sectioned through track roller frame 20 reveals an integrated track adjustment/recoil system unit 40 cantilever mounted in the track roller frame 20 and operably coupled to resist movement of the axle 32 of idler 30 along a recoil line 33. In the illustrated embodiment, recoil line 33 is straight, not curved. The integrated track adjustment/recoil system (hereinafter ITARS) unit is cantilever mounted to track roller frame 20 by an array of fastener bores 46 through a bulkhead attachment flange 48 that correspond to an array of threaded fastener bores 36 defined by a bulkhead 22. Thus, the only contact between the ITARS unit 40 and the track roller frame 20 in the illustrated embodiment is the annular surface 39 where flange 48 contacts an idler side 23 of bulkhead 22. Preferably, the array of fastener bores 46 and their counterpart array of threaded fastener bores 36 have a distribution around centerline 43 that permits alignment in only one orientation, such as with a single one of the bores in each array being located at the twelve o'clock position as shown by the sectioned view in FIG. 2. In the illustrated embodiment, the only attachment location of the ITARS unit to track roller frame 20 occurs at bulkhead 22. Also, the only contact between the ITARS unit and track roller frame 20 with regard to illustrated embodiment occurs at the attachment location between flange 48 and bulkhead 22. The coupling between the ITARS unit 40 and the idler 30 is facilitated by a yoke 34 that contacts a domed end 42 of a track adjust piston 55 at an idler recoil contact location 35 that is intersected by a centerline 43 of the ITARS unit 40. In the illustrated embodiment, recoil line 33 and centerline 43 are parallel. In order to avoid potential transfer of side forces and vertical forces from the idler 30 and yoke 34, the yoke is unattached to the ITARS unit and the contact between yoke 34 and the ITARS unit 40 occurs at the crown of domed end 42.

Figure 3:
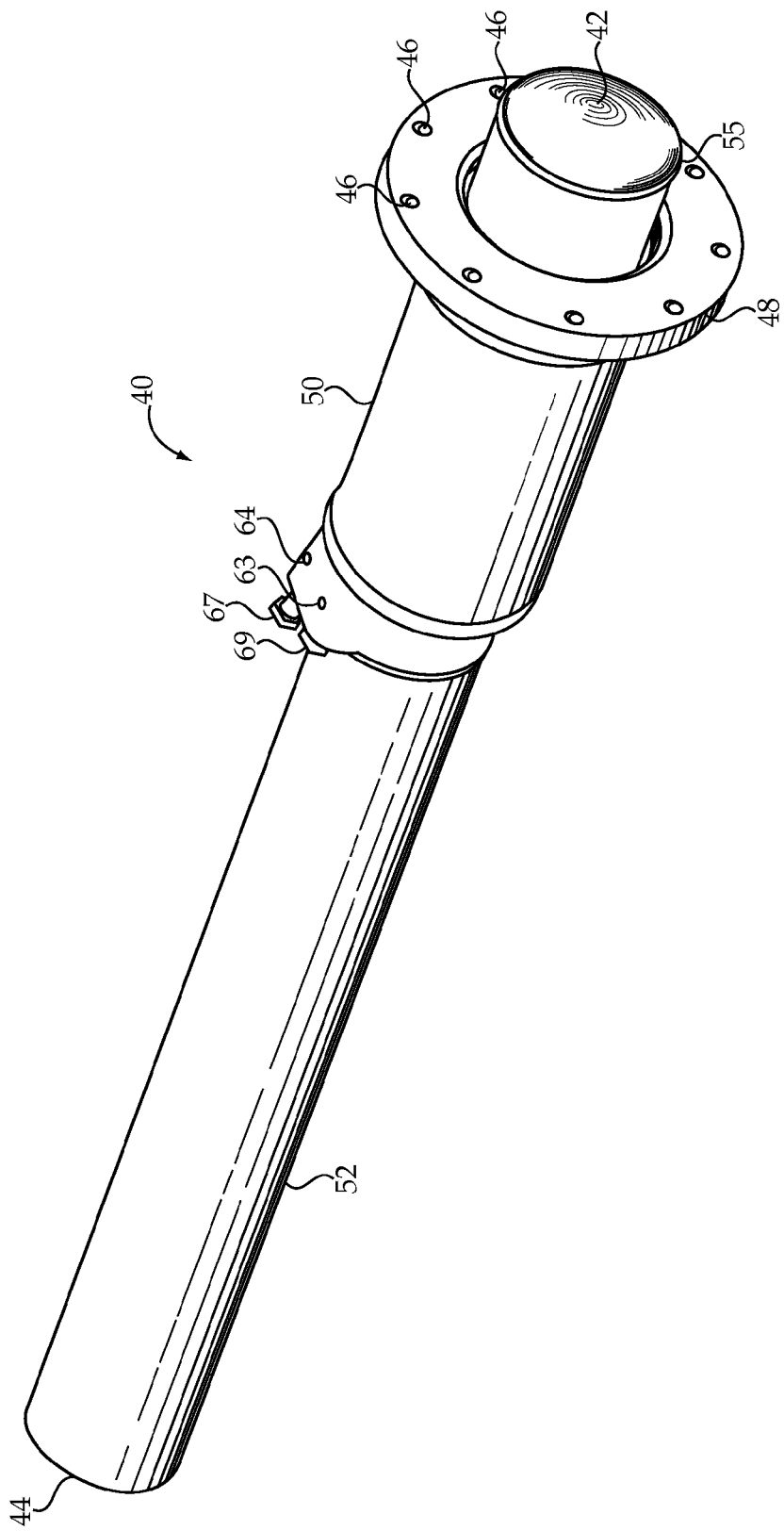
FIG. 3 is a perspective view of an integrated track adjustment/recoil system unit according to the present disclosure.
Figure 4:
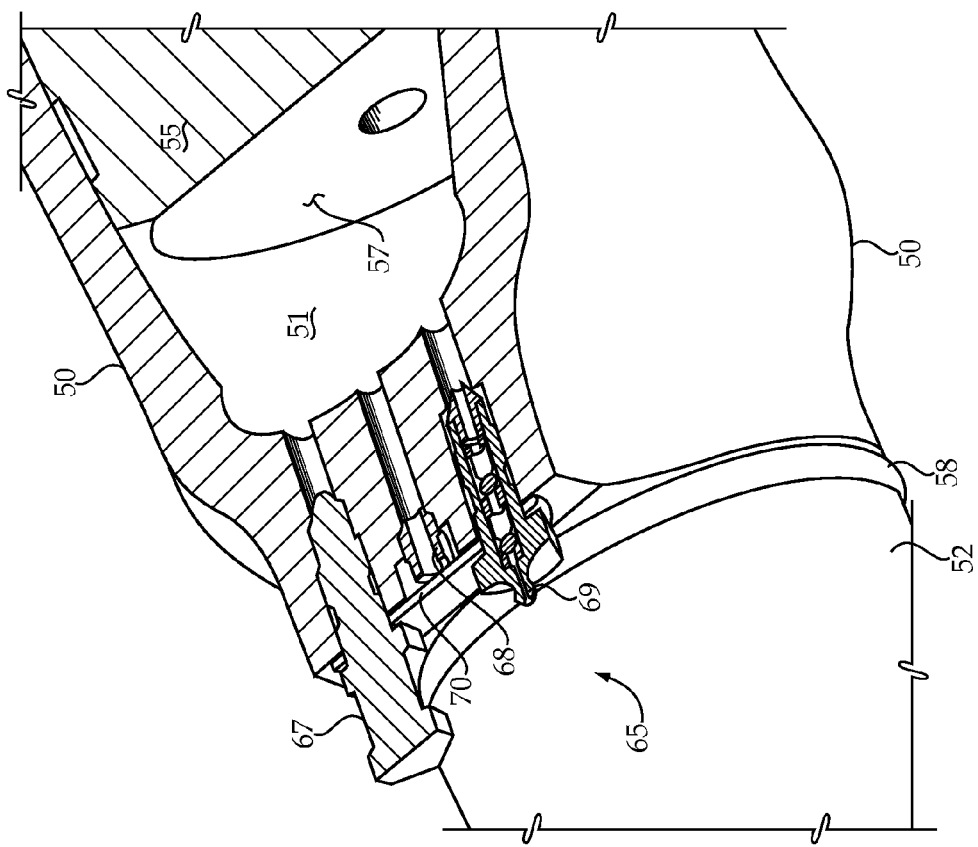
FIG. 4 is an enlarged partial sectioned view through a portion of a track adjustment cylinder of the integrated track adjustment/recoil system unit of FIG. 3.

Referring now specifically to FIGS. 2-4, the various features of the ITARS unit 40 will be shown and described. The ITARS unit 40 includes a track adjust cylinder 50 joined to a gas cylinder 52 by a reversible joining component 54 that includes two sets of identical threads 81. Thus, track adjust cylinder 50 and gas cylinder 52 each include a set of identical internal threads 62 and 77 that match the external threads 81 of the joining component 54. By cantilever mounting the ITARS unit 40 in track roller frame 20, gas cylinder 52 may have no contact with, and certainly no attachment to, track roller frame 20. A thread protection o-ring 58 is pinched between track adjust cylinder 50 and gas cylinder 52 to protect the threads of the track adjust cylinder, the gas cylinder and the joining component 54. Thus, in the illustrated embodiment, there is no contact between the gas cylinder 52 and the track adjust cylinder 50. The gas cylinder 52 may be a standard available hydraulic accumulator that is commercially available from several sources known in the art. The simplicity of the design may allow the usage of a standard hydraulic accumulator, such as those available from PARKER/HANNIFIN that comes with a gas fill valve 72 attached to the back end 44 at end face 71, and is adapted by substituting the joining component 54 in place of the standard issue hydraulic cap (not shown). Thus, the gas spring portion, which may utilize nitrogen gas, of the ITARS unit 40 essentially utilizes very inexpensive off the shelf components. In this case, the accumulator piston acts as a recoil piston 56 that moves along centerline 43 during a dynamic recoil event. In order to properly function in the ITARS unit 40, a travel limiter 73 may be inserted into gas cylinder 52 in order to define a stop surface 74 that defines the maximum travel distance of recoil piston 56 into the gas cylinder 52 during a recoil event. In such a case, the recoil piston 56 may come in contact with stop surface 74. Although travel limiter 73 is illustrated as a simple hollow cylinder 75 that includes a stop surface 74 defined by an annular end face 76, those skilled in the art will appreciate that travel limiter 73 can take on a wide variety of forms and shapes without departing from the present disclosure. Gas cylinder 52, together with recoil piston 56, define a gas volume 53 whose pressure can be set to any desired magnitude in a conventional manner via gas fill valve 72. This gas pressure may be set prior to installation, and track roller frame 20 may include an access opening to facilitate access to gas fill valve 72 after installation so that the pressure in gas volume 53 can be checked and/or adjusted. Although reversible joining component 54 may be a custom part, it includes standard external thread patterns associated with the commercially available gas cylinder 52. Between recoil events, the pressure in gas volume 63 acts upon pneumatic face 88 of recoil piston 56 to bias it into contact with reversible joining component 54, as shown. The ITARS unit 40 includes only a single spring, namely the pneumatic spring defined by gas volume 53.

The track adjust cylinder 50 may be constructed from a metallic casting to define a bore 60 extending therethrough. One end of track adjust cylinder 50 includes the bulkhead attachment flange 48 that defines the array of fastener bores 46, while the other end 61 of the bore 60 defines a set of internal threads 62. Bore 60 may be sized such that the track adjust piston 55 and the recoil piston 56 have the same or different working diameters, depending upon the particular application. In the illustrated embodiment, the two pistons 55 and 56 have different working diameters. Thus, the track adjust piston 55 is partially received in bore 60 and is surrounded by the array of fastener bores 46. The reversible joining component 54 may define one or more fluid passages 80 so that grease in cylinder 50 may be displaced into gas cylinder 52 during a dynamic recoil event. In particular, track adjust cylinder 50, a hydraulic face 57 of track adjust piston 55, reversible joining component 54, a portion of gas cylinder 52 and a hydraulic face 87 of recoil piston 56 together define a grease volume 51. By utilizing a reversible joining component 54 that includes two sets of identical threads 81 for mating with associated threads of track adjust cylinder 50 and gas cylinder 52, identical sealing geometries may also be included with respect to cylinders 50 and 52, such as o-rings located at opposite ends of reversible joining component 54 in a known manner. Sealing between track adjust piston 55 and track adjust cylinder 50 may be conventional via the inclusion of wear bands around the annular surface of piston 55 along with possibly a U-cup seal positioned between cylinder 50 and piston 55 inboard of a wiper seal that inhibits entry of debris since a portion of track adjust piston 55 is exposed outside of track adjust cylinder 50 as shown.

Track adjust cylinder 50 may be finished to include various bores, threads and passageways to facilitate the addition or removal of grease from grease volume 51, as well as the ability to bleed gas from grease volume 51. In particular, a burst fuse or relief valve 68 may be threaded into an associated bore of track adjust cylinder 50 to allow a strategy for release of pressure in the event that grease volume 51 becomes overpressurized. Likewise, a bleed valve 67 may also be threaded into and seated on track adjust cylinder in order to facilitate bleeding off of gas, excess grease, or some other undesirable fluid from grease volume 51 through port 64 in a conventional manner. Finally, a fill valve 69 may be threaded into and seated onto track adjust cylinder 50 to facilitate the addition of grease to grease volume 51 in a conventional manner, or also unthreaded to open port 63, for redundant bleed purposes. Together, bleed valve 67 and fill valve 69 may hold a cover plate 70 in place that inherently requires pressure to be relieved in grease volume 51 by the removal of bleed valve 67 and fill valve 69 before accessing burst fuse 68. Thus, bleed valve 67, burst fuse 68 and fill valve 69 constitute at least one valve 65 at contact with and attached to the track adjust cylinder 50.

INDUSTRIAL APPLICABILITY

The present disclosure is generally applicable to any track type machine, and especially those in need of a recoil capability that allows for ingestion of debris between the rotating idler and the track to prevent overstressing and potential breakage of the track or other components during normal operation. In addition, the present disclosure is applicable to those track machines that need some ability to adjust track tension, which may vary due to normal wear in the track, underlying rollers, idlers and sprockets.

The ITARS unit 40 of the present disclosure has the specific advantage over the prior art in that it may be preassembled prior to installation and construction of the associated track type machine 10, which can result in reduced costs. The ITARS unit 40 has an identity as shown in FIG. 3 apart from track roller frame 20. During installation, an overhead crane may be utilized to hold one of the ITARSs units 40 as shown in FIG. 3 in a generally horizontal position. The crane is then utilized to slide the unit 40 into one end of a track roller frame 20 until the attachment flange 40 contacts with the idler side 23 of counterpart bulkhead 22, allowing attachment of one or more fasteners therebetween. After the initial attachment is facilitated, the overhead crane may be detached, and the remaining fasteners may be inserted through the array of fastener bores 46 and threaded into the associated array of threaded fastener bores 36 in track roller frame 20 to finalize the cantilever mounting of the ITARS unit 40 into the track roller frame 20. After the later, the idler 30 and track 16 will be mounted on the track roller frame 20 in a conventional manner. In the illustrated embodiment, the idler 30 is slide mounted rather than pivot mounted in the track roller frame so that the recoil line 43 is straight, rather than curved. After this is accomplished, an access opening, (not shown) into the track roller frame may allow for access to the valves 65 to adjust the amount of grease in grease volume 51 to properly tension track 16.

By sharing the working fluid (e.g., grease) between the track adjust cylinder 50 and the gas cylinder 52, the functions of the recoil system and the track adjust system are combined without losing the functionality of either. This may result in a drastically simplified system which is significantly less complex and more cost effective than traditional systems. By cantilever mounting the ITARS unit 50 only to bulkhead 22 of track roller frame 20, the track roller frame length does not influence the recoil system. This allows the potential usage of the same system on multiple different track roller frames associated with different machines. In other words, by adjusting the working pressure in the gas cylinder appropriately, the same ITARS unit 40 may be utilized in two different sized track type tractors having different length and shaped track roller frames. All of the recoil forces are countered with only a single pneumatic spring through the idler side 23 of bulkhead 22 of the track roller 20 frame via the cantilevering of the system. This mounting strategy removes the need for any rear support of the ITARS unit 40. However, it may be prudent to do some analysis with regard to resonant frequencies of the ITARS unit 40 after installation in order to avoid excitation of potentially harmful vibrations. For instance, a modal analysis might be performed to ensure that no resonant frequencies may be encountered during expected track pass frequency ranges, which is associated with the frequency of grosser tips of the track 16 hitting the ground during normal operation. In the event that excitation of resonant frequencies may be of concern, some damping strategy may be utilized such as inserting a damping component (e.g., rubber) between gas cylinder 52 and an internal surface of track roller frame 20.

To collapse the ITARS unit 40 in order to install track 16, either the bleed valve 67 or fill valve 69 may be open to drain some oil/grease from the track adjustment cylinder 50. This will allow the track adjust piston 55 to move to the left to allow the idler to move and the track 16 to be installed. To adjust the track 16 out, grease or oil is pumped into the grease volume 51 through fill valve 69. The hydraulic pressure forces the track adjust piston 55 to the right, which moves the idler 30 outward until proper track sag is achieved. Still, the pressure of the gas in gas volume 53 is sufficient to maintain recoil piston 56 in contact with reversible joining component 54 in the normal range of grease pressures in grease volume 51 associated with the full range of expected track tension adjustment.

The gas pre-charge pressure in gas volume 53 may be chosen to provide a preload of one machine 10 weight on the idler 30. When rearward idler forces exceed this amount, the system will recoil. During dynamic recoil, the track adjust piston 55 moves to the left, forcing the grease in the track adjust cylinder 50 through the fluid passage 80 of joining component 54 and into the gas cylinder 52. This grease acts upon the hydraulic face 87 of recoil piston 56 pushing it deeper into gas cylinder 52 compressing the gas, such as nitrogen gas in the gas volume 53. The travel limiter 73 defines the maximum recoil travel distance of recoil piston 56. Because the travel limiter 73 is a separate component, the maximum recoil travel distance can be chosen independent of the track adjustment features of the ITARS unit. The domed interaction between the track adjustment piston 55 and the yoke 34 prevent idler vertical and side loads from being transmitted to the ITARS unit 40. In otherwords, the contact ensures that the load is co-axial with the centerline 43 of the ITARS unit, avoiding any bending loads.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. An integrated track adjustment/recoil system unit for installation in a track roller frame of a machine, the unit comprising:

a track adjust cylinder defining a bore extending therethrough and including a bulkhead attachment flange defining an array of fastener bores, and one end of the bore being defined by a set of internal threads;

a track adjust piston partially received in the bore and being surrounded by the array of fastener bores;

a joining component defining a fluid passage therethrough and including a first set of external threads mated to the internal threads of the track adjust cylinder, and a second set of external threads;

a gas cylinder with a set of internal threads mated to the second set of external threads of the joining component;

a recoil piston positioned inside the gas cylinder and having a hydraulic face exposed to fluid pressure in the track adjust cylinder, and a pneumatic face exposed to fluid pressure in the gas cylinder;

the recoil piston and the gas cylinder defining a gas volume; and the recoil piston, the gas cylinder, the joining component, the track adjust cylinder and the track adjust piston defining a grease volume.

2. The integrated track adjustment/recoil system unit of claim 1 including a travel limiter positioned in the gas volume that includes a stop surface that contacts the recoil piston when the recoil piston has moved a maximum recoil distance into the gas cylinder.

3. The integrated track adjustment/recoil system unit of claim 2 wherein the track adjust piston terminates in a domed end outside the track adjust cylinder with an idler recoil contact location intersected by a centerline of the track adjust piston.

4. The integrated track adjustment/recoil system unit of claim 3 wherein the first and second sets of external threads of the of the joining component are identical; and the joining component includes identical sealing geometries with respect to the track adjust cylinder and the gas cylinder.

5. The integrated track adjustment/recoil system unit of claim 4 including at least one valve in contact with and attached to the track adjust cylinder.

6. The integrated track adjustment/recoil system unit of claim 5 wherein the track adjust piston and the recoil piston have different working diameters.

7. The integrated track adjustment/recoil system unit of claim 6 wherein the array of fastener bores line up with a counterpart array of fastener bores of the track roller frame in only one orientation about the centerline;

a valve attached to an end face of the gas cylinder; and the travel limiter is a hollow cylinder, and the stop surface is an annular end face of the hollow cylinder.

8. A machine comprising:

a machine body that includes a track roller frame with a bulkhead;

an idler mounted in the track roller frame, and having an axle movable with respect to the track roller frame along a recoil line;

an integrated track adjustment/recoil system unit cantilever mounted in the track roller frame and being operably coupled to resist movement of the idler along the recoil line; and the integrated track adjustment/recoil system unit including a bulkhead attachment flange in contact with an idler side of the bulkhead;

wherein the only contact between the integrated track adjustment/recoil system unit and the track roller frame is an annular surface.

9. The machine of claim 8 wherein the integrated track adjustment/recoil system unit terminates in a domed end that contacts a yoke at an idler recoil contact location intersected by a centerline of a track adjust piston.

10. The machine of claim 9 wherein the integrated track adjustment/recoil system unit defines an array of fastener bores that line up with a counterpart array of fastener bores of the track roller frame in only one orientation about the centerline.

11. The machine of claim 10 wherein the integrated track adjustment/recoil system unit includes a track adjust cylinder joined to a gas cylinder by a reversible joining component that includes two sets of identical external threads.

12. The machine of claim 11 wherein the integrated track adjustment/recoil system unit includes a thread protection O-ring pinched between the track adjust cylinder and the gas cylinder.

13. The machine of claim 12 wherein the integrated track adjustment/recoil system unit includes:

the track adjust cylinder defining a bore extending therethrough with one end defined by a set of internal threads, and including a bulkhead attachment flange defining the array of fastener bores;

a track adjust piston partially received in the bore and being surrounded by the array of fastener bores;

the joining component defining a fluid passage therethrough and including a first set of the two sets of identical external threads mated to the internal threads of the track adjust cylinder;

the gas cylinder includes a set of internal threads mated to a second set of two sets of identical external threads of the joining component;

a recoil piston positioned inside the gas cylinder and having a hydraulic face exposed to fluid pressure in the track adjust cylinder, and a pneumatic face exposed to fluid pressure in the gas cylinder;

the recoil piston and the gas cylinder defining a gas volume; and the recoil piston, the gas cylinder the joining component, the track adjust cylinder and the track adjust piston defining a grease volume.

14. The machine of claim 13 wherein the integrated track adjustment/recoil system unit includes a travel limiter positioned in the gas volume that includes a stop surface that contacts the recoil piston when the recoil piston has moved a maximum recoil distance into the gas cylinder;

at least one valve in contact with and attached to the track adjust cylinder;

the track adjust piston and the recoil piston have different working diameters;

a valve attached to an end face of the gas cylinder; and the travel limiter is a hollow cylinder, and the stop surface is an annular end face of the hollow cylinder.

* * * * *